(12) United States Patent
Park et al.

(10) Patent No.: US 6,452,658 B1
(45) Date of Patent: Sep. 17, 2002

(54) REFLECTIVE LCD HAVING HIGH TRANSMITTANCE AND METHOD FOR MANUFACTURING THE SAME

(75) Inventors: In Cheol Park, Seoul; Seung Hee Lee, Kyoungki-do; Won Geon Lee, Seoul, all of (KR)

(73) Assignee: Hyundai Display Technology Inc., Kyoungki-do (KR)

( * ) Notice: Subject to any disclaimer, the term of this patent is extended or adjusted under 35 U.S.C. 154(b) by 0 days.

(21) Appl. No.: 10/015,082

(22) Filed: Dec. 11, 2001

Related U.S. Application Data

(62) Division of application No. 09/379,452, filed on Aug. 23, 1999, now Pat. No. 6,351,300.

(30) Foreign Application Priority Data

Aug. 24, 1998 (KR) .......................................... 98-34237

(51) Int. Cl.[7] ............................................. G02F 1/1343
(52) U.S. Cl. ..................................................... 349/141
(58) Field of Search ........................... 349/141, 42, 110, 349/113, 106, 138, 139

(56) References Cited

U.S. PATENT DOCUMENTS 5,805,247 A * 9/1998 Oh-e et al.
6,064,460 A * 5/2000 Ohta et al.
6,181,398 B1 * 1/2001 Libsch et al.
6,233,034 B1 * 5/2001 Lee et al.

* cited by examiner

Primary Examiner—William L. Sikes
Assistant Examiner—Julie Ngo
(74) Attorney, Agent, or Firm—Ladas & Parry

(57) ABSTRACT

Disclosed is a reflective liquid crystal display having high transmittance and a method for manufacturing the same. The method comprises the steps of: forming a gate bus line and a common signal line by depositing a metal layer on a lower substrate and by patterning a selected portion of the metal layer; forming a gate insulating layer on the lower substrate in which the gate bus line is formed; forming a channel layer on a selected portion of the gate insulating layer having the gate bus line; forming a source electrode overlapped with one side of the channel layer, a drain electrode overlapped with the other side of the channel layer, and a data bus line being contacted to the source electrode and crossed with the gate bus line, by depositing a metal layer on the gate insulating layer in which the channel layer is formed, and by patterning a selected portion of the metal layer; forming an intermetal insulating layer having a uniform topology on a surface of the gate insulating layer; etching selected portions of the intermetal insulating layer and the gate insulating layer so as to expose selected portions of the common signal line and the drain electrode; and forming a counter electrode contacted with the common signal line and a pixel electrode contacted with the drain electrode by depositing a transparent metal layer on the intermetal insulating layer and by patterning a selected portion of the transparent metal layer. (FIG. 3)

2 Claims, 9 Drawing Sheets

REFLECTIVE LCD HAVING HIGH TRANSMITTANCE AND METHOD FOR MANUFACTURING THE SAME

This application is a division of U.S. Ser. No. 09/379,452 filed Aug. 23, 1999, which is now U.S. Pat. No. 6,351,300 and is hereby incorporated herein by reference.

BACKGROUND OF THE INVENTION

The present invention relates to a reflective liquid crystal display (hereinafter "LCD") and a method for manufacturing the same, more particularly to a reflective LCD having high transmittance.

BACKGROUND OF THE INVENTION

The reflective LCD generally uses natural light as a light source rather than additional light source. In this reflective LCD, a natural light is radiated from an upper substrate, and then the light is reflected via a reflecting plate disposed at a bottom position of a lower substrate. At this time, the light is absorbed or transmitted according to the arrangement of liquid crystal molecules.

The general twisted nematic(TN) mode reflective LCD has the drawback of narrow viewing angle. Therefore, conventionally the hybrid mode reflective LCD capable of displaying full color and having a fast response time in the low voltage condition has been suggested. However, the hybrid mode reflective LCD only uses the birefringence effect of liquid crystal molecules, accordingly the contrast ratio is degraded since the gray scale inversion is easily occurred depending on the viewing direction. To solve foregoing problem, a bi-axial compensating film is applied to the hybrid mode reflective LCD. However, the bi-axial compensating film is difficult to produce and it is also difficult to apply to cells.

Therefore, conventionally the reflective LCD without using any optical compensating film has been suggested to solve the problem of gray scale inversion and to obtain high transmittance and wide viewing angle.

FIG. 1 is a cross-sectional view showing a conventional reflective LCD having high transmittance.

First of all, a metal layer is deposited on a lower substrate 1 and a selected portion of the same is patterned, thereby forming a gate bus line(not shown) and a common signal line (not shown). After an ITO layer is deposited on the lower substrate 1, the ITO layer is patterned to be contacted with the common signal line so that the ITO layer has a shape of comb, thereby forming a counter electrode 2. At this time, each tooth of the comb of the counter electrode 2 is separated by a selected distance. Afterward, a gate insulating layer 4 is deposited on the lower substrate 1 in which the counter electrode 2, the gate bus line and the common signal line are formed. A channel layer(not shown) and an ohmic layer(not shown) are formed on a selected portion of the gate insulating layer 4, thereby defining an active region. A metal layer is deposited on the gate insulating layer 4 in which the channel layer and the ohmic layer are formed, and a selected portion of the metal layer is patterned, thereby forming a source electrode(not shown), a drain electrode(not shown) and a data bus line(not shown). Consequently, a thin film transistor(not shown) is completed. Another ITO layer is deposited over the gate insulating layer in which the thin film transistor is formed, and the ITO layer is patterned so as to contact with the drain electrode, thereby forming a pixel electrode 6. The pixel electrode 6 also has a shape of comb and its teeth are disposed between those teeth of the counter electrode 2. A first homogeneous alignment layer 8 is formed on the gate insulating layer in which the pixel electrode 6 and the thin film transistor(not shown) are formed. In the meantime, a color filter 12 is attached to one face of an upper substrate 10 and a second homogeneous alignment layer 14 is formed on a surface of the color filter 12. The lower substrate 1 and the upper substrate 10 are attached by intervening a selected distance therebetween so that the first and the second homogeneous alignment layers 8,14 are opposed each other. A liquid crystal layer 15 is sandwiched between the lower substrate 1 and the upper substrate 10. A polarizer 17 is attached to an outer face of the upper substrate 10, and a quarter wave plate 18 and a reflecting plate 19 are attached to an outer face of the lower substrate 1.

Herein, a distance l1 between the tooth of the counter electrode 2 and that of the pixel electrode 6 is preferably narrower than a distance d1 between both substrates 1,10, i.e. the cell gap. It is preferable that a width P1 of the counter electrode 2 and a width P2 of the pixel electrode 6 are formed such that liquid crystal molecules in upper portions of the electrodes are sufficiently driven in the presence of electric field.

In this reflective LCD, there is formed a fringe field Ef between the counter electrode 2 and the pixel electrode 6 as shown in the drawing when voltage is applied to the counter electrode 2 and the pixel electrode 6. Therefore, liquid crystal molecules on and between both electrodes 2,6 are all driven, thereby greatly improving the transmittance.

However, the conventional reflective LCD having high transmittance has following drawbacks.

First of all, the conventional reflective LCD having high transmittance has the counter electrode 2 and the pixel electrode 6, both made of a transparent conductor such as the ITO layer. Therefore, the counter electrode 2 is not formed at the same time with the gate bus line, and the pixel electrode 6 is not formed at the same time with the data bus line.

That is to say, the counter electrode 2 is formed after the gate bus line is formed, and the pixel electrode 6 is formed after the data bus line is formed. Accordingly, there may be added a mask pattern and manufacturing process is complicated.

Furthermore, compared with a general reflective TN LCD, the conventional reflective liquid crystal display having high transmittance has no topology which is formed on the lower substrate for scattering light. Therefore, an incident light is not scattered with a wide angle when electric field is applied. Further, excellent viewing angle characteristic is obtained at front side of a screen, while poor viewing angle characteristic is found at the sides of the screen.

SUMMARY OF THE INVENTION

Accordingly, it is one object of the present invention to provide a method for manufacturing a reflective LCD having high transmittance, which is capable of simplifying a manufacturing process by simultaneously forming the counter electrode and the pixel electrode.

It is another object of the present invention to provide the LCD having high transmittance that can obtain wide viewing angle.

To accomplish foregoing objects, the reflective LCD comprises:

an upper and a lower substrates opposed each other by intervening a liquid crystal layer;

a first insulating layer formed on the lower substrate;

a second insulating layer formed on the first insulating layer, wherein the second insulating layer has a uniform topology on its surface; and a first and a second electrodes disposed alternatively at a sidewall of the topology in the second insulating layer, wherein a distance between the first and the second electrodes is narrower than a distance between the upper and the lower substrates so that a fringe field is formed between the first and the second electrodes.

The present invention further comprises:

a lower substrate comprising a gate bus line and a common signal line extended in a selected direction; a gate insulating layer formed on the lower substrate in which the gate bus line and the common signal lines are formed; a thin film transistor having a channel layer formed at a selected portion on the gate insulating layer having the gate bus line, and a source electrode overlapped with one side of the channel layer, and a drain electrode overlapped with the other side of the channel layer; an intermetal insulating layer formed on the gate insulating layer in which the thin film transistor is formed, and having a plurality of uniform topology on its surface; a counter electrode disposed at one sidewall of the topology of the intermetal insulating layer, and contacted with the common signal line; and a pixel electrode disposed at the other sidewall of the topology of the intermetal insulating layer and between the counter electrode, and contacted with the drain electrode wherein the pixel electrode forms a fringe filed together with the counter electrode;

an upper substrate opposed to the lower substrate and comprising a color filter at its surface;

a liquid crystal layer sandwiched between the upper and the lower substrate, and comprising a plurality of liquid crystal molecules;

a first homogeneous alignment layer and a second homogeneous alignment layer, both formed at inner faces of the upper and the lower substrates and having rubbing axes of selected directions respectively;

a polarizing plate disposed at an outer face of the upper substrate;

a reflecting plate disposed at an outer face of the lower substrate; and a quarter wave plate disposed between the reflecting plate and the lower substrate, or between the polarizing plate and the upper substrate.

According to another aspect, the present invention comprises the steps of:

forming a gate bus line and a common signal line by depositing a metal layer on a lower substrate and by patterning a selected portion of the metal layer;

forming a gate insulating layer on the lower substrate in which the gate bus line is formed;

forming a channel layer on a selected portion of the gate insulating layer having the gate bus line;

forming a source electrode overlapped with one side of the channel layer, a drain electrode overlapped with the other side of the channel layer, and a data bus line being contacted to the source electrode and crossed with the gate bus line, by depositing a metal layer on the gate insulating layer in which the channel layer is formed, and by patterning a selected portion of the metal layer;

forming an intermetal insulating layer having a uniform topology on a surface of the gate insulating layer;

etching selected portions of the intermetal insulating layer and the gate insulating layer so as to expose selected portions of the common signal line and the drain electrode; and forming a counter electrode contacted with the common signal line and a pixel electrode contacted with the drain electrode by depositing a transparent metal layer on the intermetal insulating layer and by patterning a selected portion of the transparent metal layer.

DETAILED DESCRIPTION OF THE PREFERRED EMBODIMENTS

Hereinafter, the preferred embodiment of the present invention will be described with reference to accompanying drawings.

Figure 1:
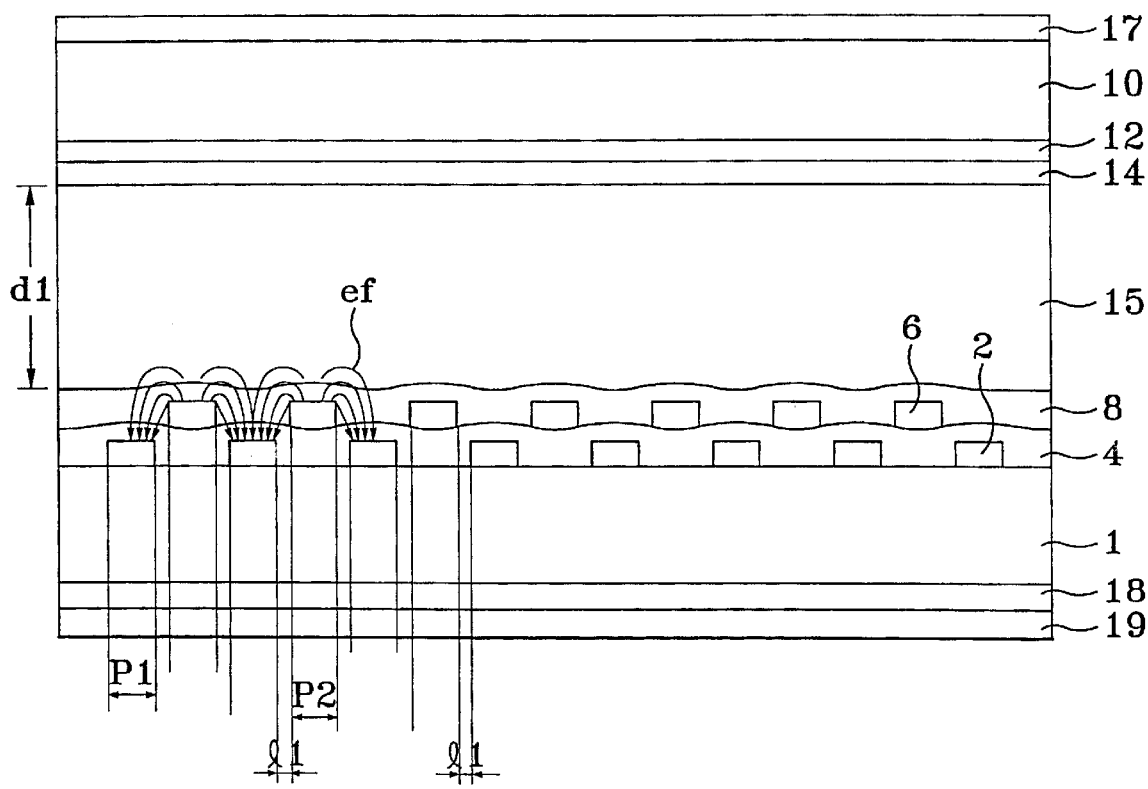
FIG. 1 is a cross-sectional view showing a conventional reflective LCD having high aperture ratio and high transmittance.
Figure 2:
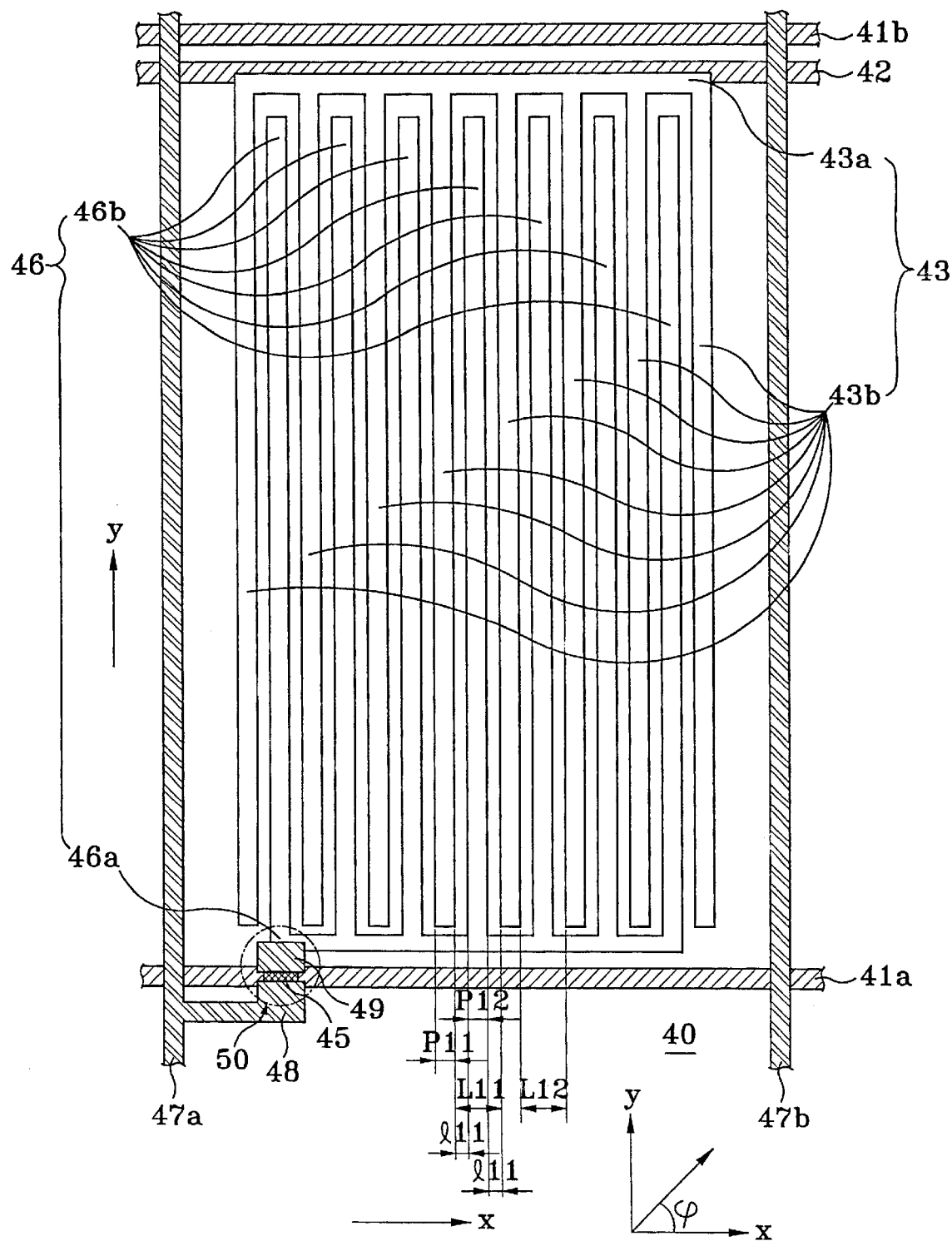
FIG. 2 is a plan view showing a lower substrate of a reflective LCD according to the present invention.
Figure 3:
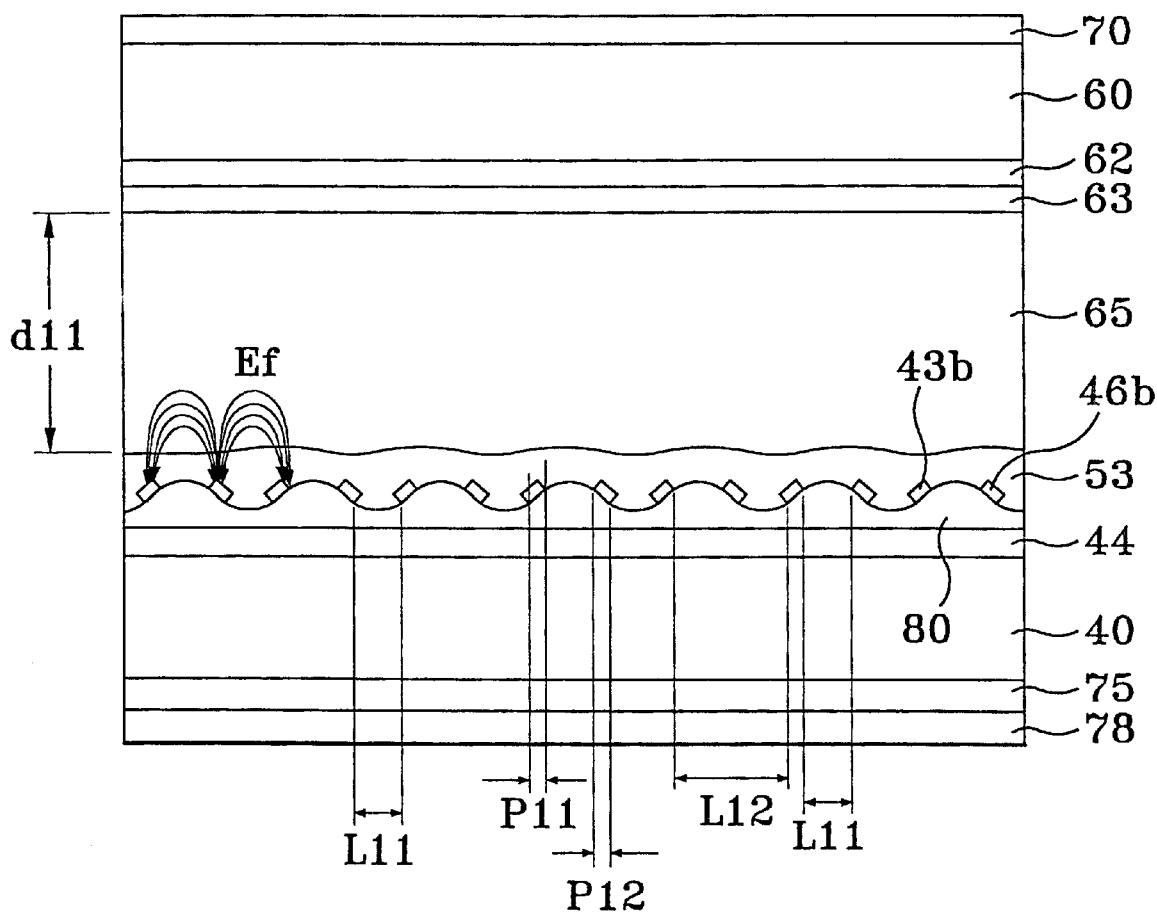
FIG. 3 is a cross-sectional view taken along the line III—III' of FIG. 2.

Referring to FIGS. 2 and 3, a construction of the present reflective LCD will be discussed.

As shown in FIGS. 2 and 3, a metal layer is deposited on a lower substrate 40 and then patterned, thereby forming gate bus lines 41a,41b and a common signal line 42. The gate bus lines 41a,41b are arranged with a selected distance on the lower substrate 40 and extended in the X direction of the drawing. A gate insulating layer 44 is formed on the lower substrate 40 in which the gate bus lines 41a,41b. A channel layer 45 is formed on the gate insulating layer 44 including the gate bus lines 41a,41b. Next, a metal layer is deposited on the gate insulating layer 44, and a selected portion of the metal layer is patterned, thereby forming a source electrode 48 being overlapped with one side of the channel layer 45, a drain electrode 49 being overlapped with the other side of the channel layer 45 and data lines 47a,47b being electrically connected to the source electrode 48. The data bus lines 47a,47b are extended in the Y direction which is crossed with the gate bus liens 41a,41b.

An intermetal insulating layer 80 is deposited over the gate insulating layer 44. A selected portion of the intermetal insulating layer 80 is partially etched by the photolithography process so that a topology having uniform height may be formed with a selected distance on a surface of the intermetal insulating layer 80. Next, the intermetal insulating layer 80 and the gate insulating layer 44, or the intermetal insulating layer 80 is etched so as to expose a selected portion of the common signal line 42 and the drain electrode 49. An ITO layer is deposited on the intermetal insulating layer 80 so as to contact with the exposed common signal line 42 and the drain electrode 49. A selected portion of the ITO layer is patterned, thereby simultaneously forming the counter electrode 43 and the pixel electrode 46. Herein, the counter electrode 43 includes a body 43a being contacted to the common signal line 42, and a plurality of teeth 43b being extended from the body 43a in the reverse-Y direction. The respective teeth 43b have a selected width P11 and separated by a selected distance L11. In the meantime, the pixel electrode 46 includes a body 46a parallel with the gate bus lines 41a,41b and contacted with the drain electrode 49 of the thin film transistor, and a plurality of teeth 46b extended from a body 46a in the Y direction of FIG. 2 and arranged between the respective teeth 43b of the counter electrode 43. At this time, the teeth 46 of the pixel electrode 46 also have a selected width P12 and separated by a selected distance L12. Herein, the counter electrode 43 and the pixel electrode 46 should be separated from each other. In addition, the teeth 43b of the counter electrode 43 are disposed at one side of the topology of the intermetal insulating layer 100, and the teeth 46b of the pixel electrode 46 are disposed at the other side of the topology of the intermetal insulating layer 80. Accordingly, the teeth 43b of the counter electrode 43 and the teeth 46b of the pixel electrode 46 are disposed in an alternative manner at a ti sidewall of the topology of the intermetal insulating layer 80. At this time, the size of this topology is formed by taking into consideration the widths P11,P12 and the distances L11,L12 of the teeth 43b,46b. The widths of the teeth 43b,46b are selected such that liquid crystal molecules in the upper portion of the teeth 43b,46b are all driven by a fringe field formed between the teeth 43b,46b. Since the counter and the pixel electrodes are formed on the same plane and manufactured by the same process, the number of manufacturing process is reduced. A first homogeneous alignment layer 53 is formed at a surface of the intermetal insulating layer 80 in which the counter electrode 43 and the pixel electrode 46 are formed.

Figure 4:
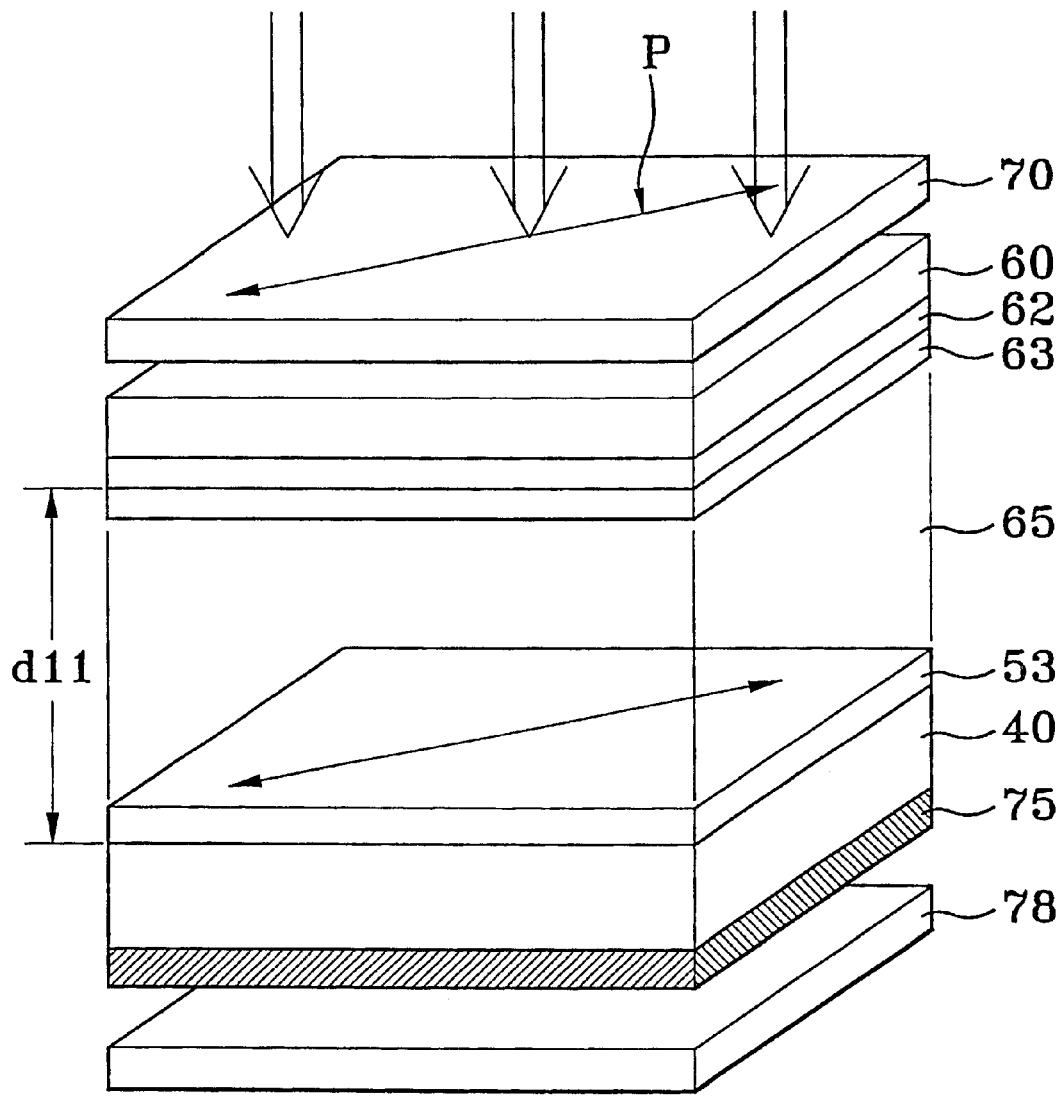
FIG. 4 is a perspective view showing the reflective LCD of the present invention.

In the meantime, referring to FIGS. 3 and 4, the reflective LCD having high transmittance according to the present invention.

As shown in FIGS. 3 and 4, an upper substrate 60 is attached over the lower substrate 40 as constructed above by intervening a selected distance d11. Herein, the distance d11 between both substrates is wider than the distance between the teeth 43b,46b of the counter electrode 43 and the pixel electrode 46 so as to forming the fringe field. A black matrix (not shown) and a color filter 62 are formed at an inner face of the upper substrate 60. A liquid crystal layer 65 comprising a plurality of liquid crystal molecules is sandwiched between both substrates 40,60. At this time, the plurality of liquid crystal molecules are nematic molecules and they may have the twist characteristic. The index of phase retardation of the liquid crystal molecules can be shown as the product of a refractive anisotropy $\Delta n$ and the cell gap d11, e.g. approximately 0.2~0.6 $\mu$m preferably. Also, the first and the second homogeneous alignment layers 53,63 have faces aligning the liquid crystal molecules(not shown) in a selected direction. Furthermore, the liquid crystal molecules in the first and the second homogeneous alignment layers 53,63 are treated to have a pretilt angle of 0°~10°. The first homogeneous alignment layer 63 formed at the lower substrate 40 is rubbed so as to make an angle $\phi$ with the X direction, and the second homogeneous alignment layer 56 formed at the upper substrate 60 is rubbed so as to make 180° with the rubbing direction of the first homogeneous alignment layer 53. At this time, if the angle between the X-axis direction(i.e. the direction of an electric field to be formed later) and the rubbing axis of the first homogeneous alignment layer 53(or the second homogeneous alignment layer) is accurately 45° both types of liquid crystal molecules of positive and negative dielectric anisotropy can be used. When said angle is over 45°, liquid crystal molecules having positive dielectric anisotropy can be used, and when the angle is below 45°, liquid crystal molecules having negative dielectric anisotropy can be used. Herein, the reason for using different liquid crystal molecules having different types of dielectric anisotropy according to the angle between the rubbing axis of the homogeneous alignment layer and the X-axis, is that a liquid crystal display may have the maximum transmittance.

A polarizing plate 70 for linearly polarizing natural light into a selected direction, is formed at an outer surface of the upper substrate 60. The polarizing plate 70 includes a polarizing axis P and this polarizing axis is parallel to the rubbing axes of the first and the second homogeneous alignment layers 53,63. A quarter wave plate 75 for shifting the phase of an incident light passed through the liquid crystal layer 65 by 90°, is formed at an outer surface of the lower substrate 40. A reflecting plate 78 for reflecting the light passed through the quarter wave plate 75 to the liquid crystal layer 78, is formed at an outer surface of the quarter wave plate 45. Herein, the quarter wave plate 75 can be formed between the polarizing plate 70 and the upper substrate 60.

Operation of the reflective LCD as constituted above will be discussed hereinafter.

First, when the gate bus lines 41a is not selected, no signal is transmitted to the pixel electrode 46 from the data bus line 47a, there is formed no electric field between the teeth 43b of the counter electrode 43 and the teeth 46b of the pixel electrode 46.

Figure 5A:
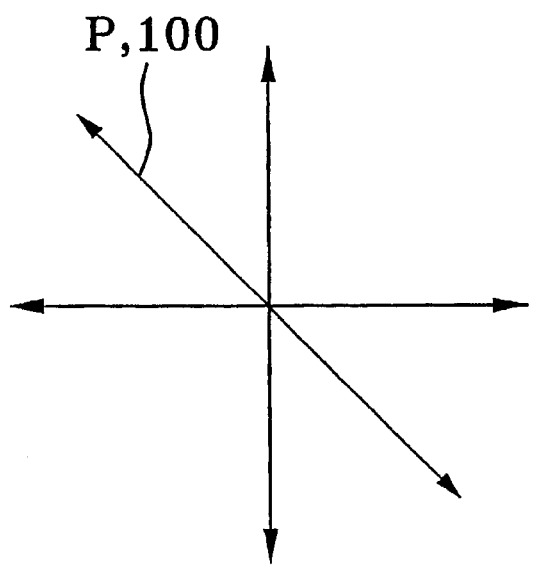
FIGS. 5A to 5D illustrate a path of incident light when the reflective LCD of the present invention is off-state.

Then this, the natural light is linearly-polarized, for example left-linearly-polarized by the polarizing plate 70. As shown in FIG. 5A, the linearly-polarized light 100 is coincided with the polarizing axis P of the polarizing plate 70. At this time, FIG. 5A shows a polarizing state of the light, assuming that the light 100 passed through the polarizing plate 70 having the same component in their horizontal and vertical phases and the transmitting direction of the polarized light is the Z-axis and the phase of the x component of the transmitted light is faster than that of the y component. The light 100 does not change its polarizing state while passing the liquid crystal layer 65.

Figure 5B:
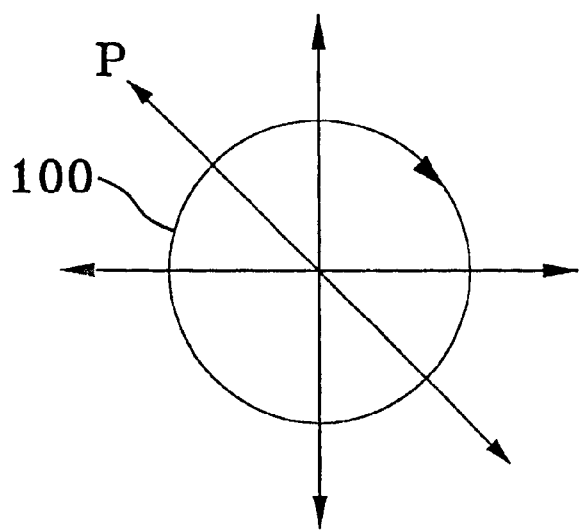

The linearly-polarized light that is passed through the liquid crystal layer 65, changes its polarizing state while passing the quarter wave plate 75. That is to say, the quarter wave plate 75 occurs a phase difference of approximately 90° i.e. a quarter of one period, for example 360° at a normal path and an abnormal path. As a result, referring to FIG. 5B, the linearly-polarized light is right-circularly-polarized while passing the quarter wave plate 75.

Figure 5C:
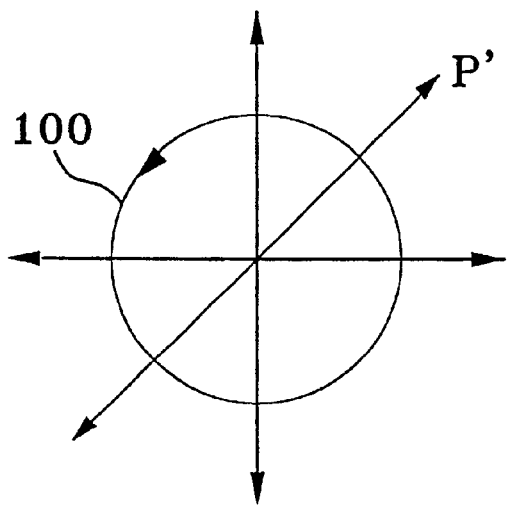

The right-circularly-polarized light that is passed through the quarter wave plate 75, occurs phase difference of 180° according to the reflecting plate 78 thereby left-circularly-polarizing the light reflected by the reflecting plate 78 as shown in FIG. 5C. At this time, by passing the reflecting plate 78, the light transmitting direction becomes the -z-axis. Accordingly, the polarizing axis of the polarizing plate 70 can be looked as P'.

Figure 5D:
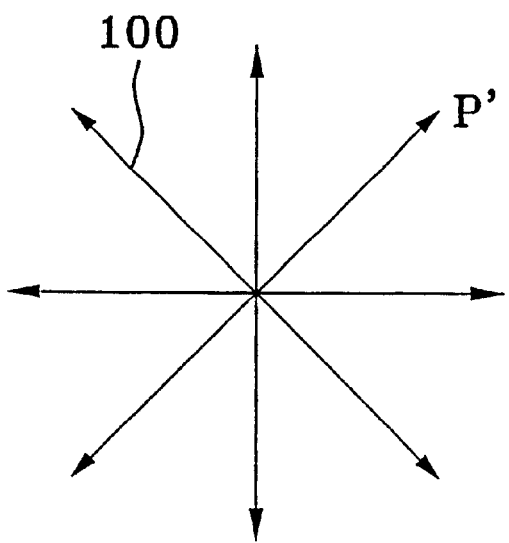

As the light passed the reflecting plate 78 is passed again the quarter wave plate 75, the right-linearly-polarized light is left-circularly-polarized as shown in FIG. 5D.

Then, the left-linearly-polarized light 100 that is passed through the quarter wave plate 75 does not change its polarizing state while passing the liquid crystal layer 65, and the light passed through the liquid crystal layer 65 arrives at the polarizing plate 70. At this time, the polarizing axis p' of the polarizing plate 70 is perpendicular to the left-linearly-polarized light 100 (in FIG. 5D). Accordingly, the light 100 does not pass the polarizing plate 70. The screen shows dark state.

On the other hand, when a scanning signal is transmitted to the gate bus line 41a and a display signal is transmitted to the data bus line 47a, the thin film transistor 50 formed adjacent to an intersection of the gate bus line 41a and the data bus line 47a is turned on thereby transmitting the signals to the pixel electrode 46. At this time, a common signal having different voltage from the display signal is continuously applied to the counter electrode 43, and there is formed an electric field Ef between the counter electrode 43 and the pixel electrode 46. Herein, the electric field Ef is substantially formed between the teeth 43b of the counter electrode 43 and the teeth 46b of the pixel electrode 46.

At this time, the distance l11 between the teeth 43b of the counter electrode 43 and the teeth 46b of the pixel electrode 46 is a bit narrower than that of the conventional LCD, therefore the fringe field Ef is formed. Further, since the widths of the teeth 43b of the counter electrode 43 and the teeth 46b of the pixel electrode 46 are sufficiently narrow such that the liquid crystal molecules in the upper portion of the electrodes 43,46 are all driven by the fringe field Ef. Accordingly, the aperture ratio and the transmittance are improved. In addition, the electrodes 43,46 are formed on the intermetal insulating layer 80, thereby scattering the incident light with a wide angle. A uniform transmittance can be obtained from not only at the front side of the screen but at the sides of the screen.

At this time, the light incident to the LCD device of the present embodiment has a transmitting process as follows.

Figure 6A:
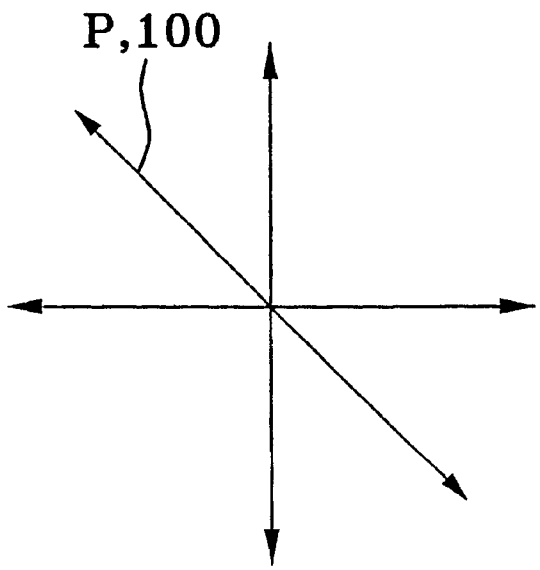
FIGS. 6A to 6E illustrate a path of incident light when the reflective LCD of the present invention is on-state.

First of all, it is on the assumption that the natural light is left-linearly-polarized in the same direction with the polarizing axis of the polarizing plate 70, when the light passes the polarizing plate 70 as shown in FIG. 6A. At this time, the light transmitting direction is the Z-axis direction.

Figure 6B:
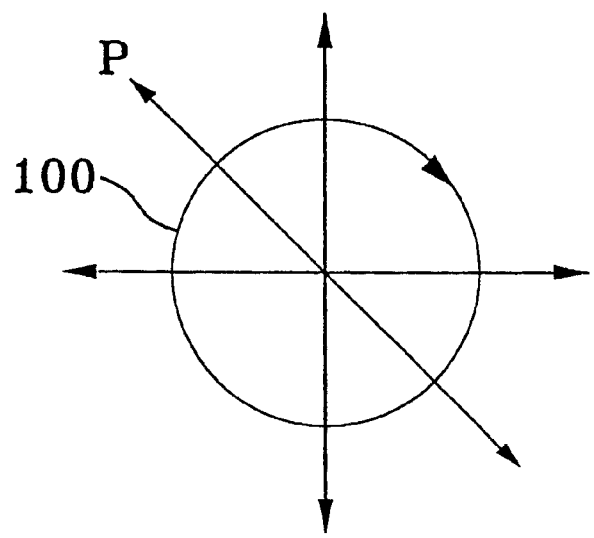

Afterward, as shown in FIG. 6B, the light passed through the polarizing plate 70 changes its polarizing state into the right-circularly-polarized state while passing the liquid crystal layer 65. In other words, the liquid crystal molecules are rearranged according to the electric field Ef, therefore the liquid crystal layer 65 has a phase difference of 90°.

Figure 6C:
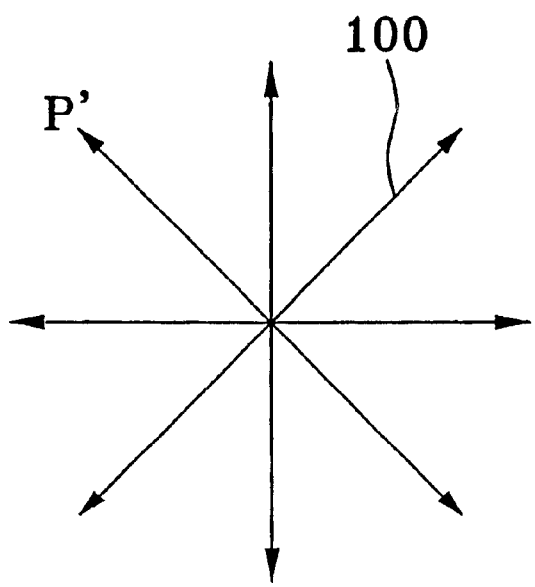

And then, the light 100 passed through the liquid crystal layer 65 is right-linearly-polarized while passing the quarter wave plate 75 having the phase difference of 90° as shown in FIG. 6C.

Figure 6D:
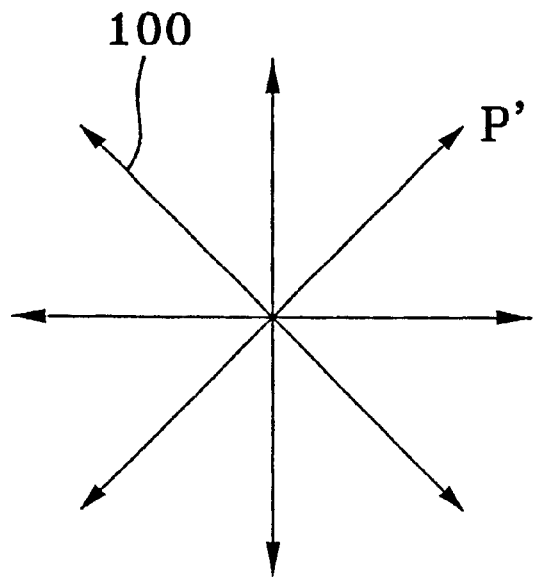

The light 100 passed through the quarter wave plate 75 occurs a phase shift by 180° while passing the reflecting layer 78. Accordingly, the light 100 is left-linearly-polarized while passing the reflecting plate 78 as shown in FIG. 6D. At this time, the light transmitting direction becomes the -z-axis while passing the reflecting plate 78. Therefore, the direction of polarizing plate P' can be looked as right-linearly-polarized direction.

Figure 6E:
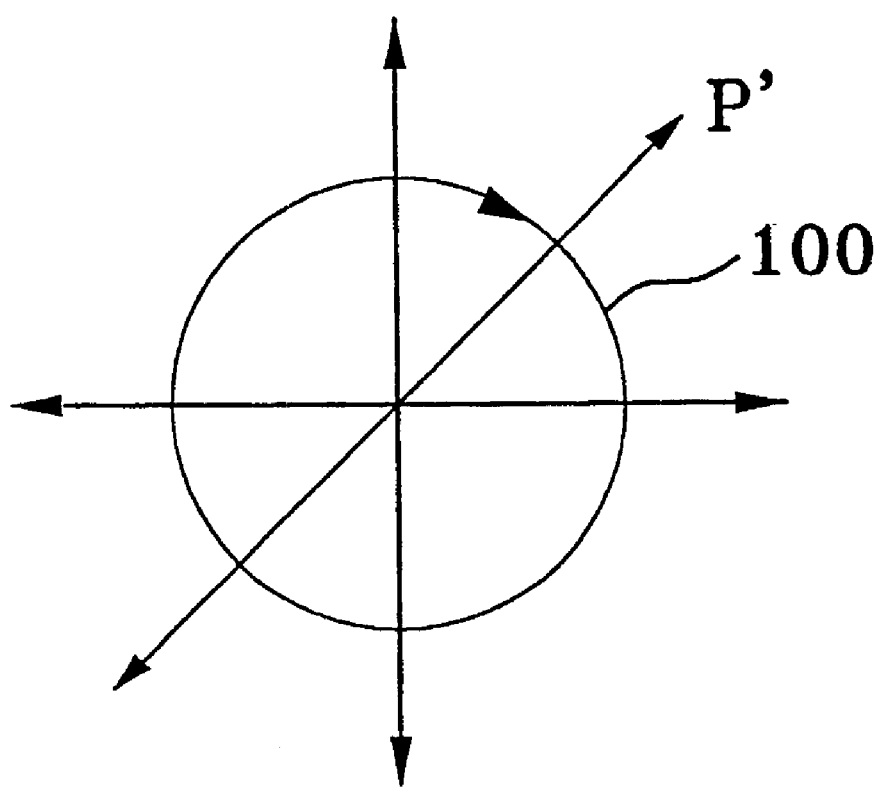

Next, as shown in FIG. 6E, the light 100 passed through the reflecting plate 78 is right-circularly-polarized while passing the quarter wave plate 75, and then, the right-circularly-polarized light is right-linearly-polarized while passing the liquid crystal layer 65. As a result, the right-circularly-polarized light 100 passed through the liquid crystal layer 65 is coincided with the direction of polarizing plate P' thereby passing the upper polarizing plate 70. The screen shows white state.

As described in the above specification, in this reflective LCD, the intermetal insulating layer in which the topology is formed, is deposited on a surface of the gate insulating layer, and the counter electrode and the pixel electrode are formed on the intermetal insulating layer at the same time. As a result, steps of depositing and patterning the ITO can be deleted thereby reducing the number of manufacturing process and also reducing manufacturing cost.

Furthermore, the teeth of the counter electrode and the pixel electrode are disposed in an alternative manner at the sidewalls of the intermetal insulating layer in which the topology is formed, thereby scattering the light reflected from the reflecting plate with a wide angle. Therefore, transmittance at the sides of the screen and the viewing angle characteristic thereof are improved.

Various other modifications will be apparent to and can be readily made by those skilled in the art without departing from the scope and spirit of the present invention.

What is claimed is:

1. A method for manufacturing a reflective LCD having high transmittance comprising the steps of:

forming a gate bus line and a common signal line by depositing a metal layer on a lower substrate and by patterning a selected portion of the metal layer;

forming a gate insulating layer on the lower substrate in which the gate bus line is formed;

forming a channel layer on a selected portion of the gate insulating layer having the gate bus line;

forming a source electrode overlapped with one side of the channel layer, a drain electrode overlapped with the other side of the channel layer, and a data bus line being contacted to the source electrode and crossed with the gate bus line, by depositing a metal layer on the gate insulating layer in which the channel layer is formed, and by patterning a selected portion of the metal layer;

forming an intermetal insulating layer having a uniform topology on a surface of the gate insulating layer;

etching selected portions of the intermetal insulating layer and the gate insulating layer so as to expose selected portions of the common signal line and the drain electrode; and forming a counter electrode contacted with the common signal line and a pixel electrode contacted with the drain electrode by depositing an ITO layer on the intermetal insulating layer and by patterning a selected portion of the transparent metal layer.

2. The method of claim 1, wherein the step of forming the intermetal insulating layer having the topology comprises the steps of depositing the intermetal insulating layer and forming the topology on the surface of the intermetal insulating layer by etching a selected portion of a surface of the intermetal insulating layer according to a photolithography process.

* * * * *